Nov. 30, 1926.
T. S. WALKER ET AL
SHIP LOG
Filed Dec. 31, 1925
1,609,229
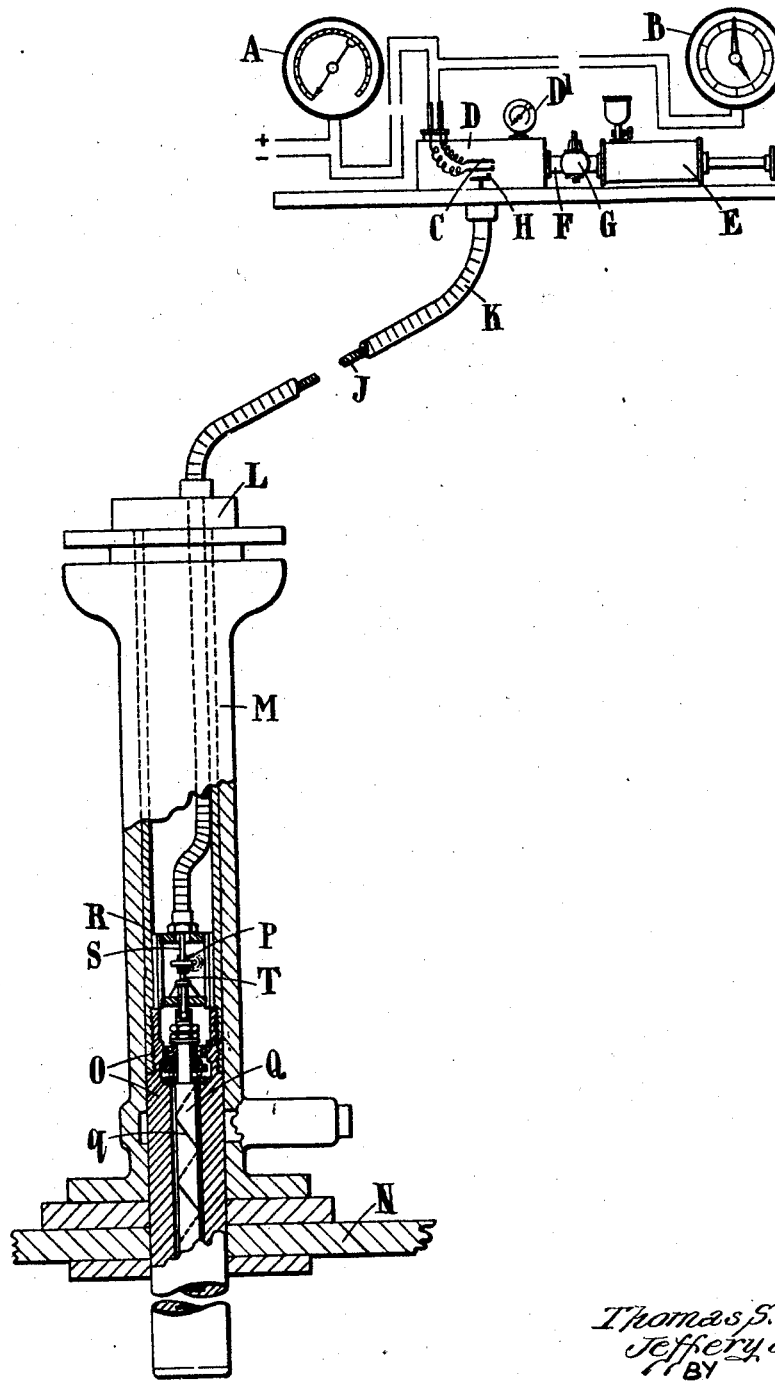
INVENTORS
Thomas S. Walker
Jeffery Walker
BY
James L. Norris
ATTORNEY Patented Nov. 30, 1926.

1,609,229

UNITED STATES PATENT OFFICE.

THOMAS SYDNEY WALKER AND JEFFERY WALKER, OF BIRMINGHAM, ENGLAND.

SHIP LOG.

Application filed December 31, 1925, Serial No. 78,607, and in Great Britain January 9, 1925.

This invention relates to ship logs of the submerged type and it has for its objects, to ensure more accurate operation of such logs by reducing the wear on the working parts, and also to obviate the necessity for frequently inspecting and cleaning those parts.

In ship logs of the submerged type there is constant necessity to attend to the lubrication of the mechanism and the rotating parts and their bearings, in order that undue wear may be prevented and accuracy in working may be preserved, and it therefore becomes necessary periodically to remove the log bodily from its place of attachment to the hull of the vessel and to open up, clean out, and re-fill the casing with lubricant. These operations not only involve considerable time and unprofitably employed labour, but they are apt to be neglected or forgotten and the log mechanism becomes dirty, worn or damaged, and inaccurate in operation.

According to this invention the housing of a submerged ship log is in direct communication with a supply of lubricant and the construction of the log is such that lubricant has access through the transmission mechanism to the lowermost bearing or bearings of the rotator spindle.

The feeding of the lubricant to and through the log may be effected either under pressure or by gravity, and either automatically, semi-automatically, or manually, and indicating means may be provided, when required, which show the state of pressure of the lubricant within the log.

One constructional form of the invention is illustrated by way of example in the accompanying drawing, in which the log mechanism and its housing are shown in sectional elevation, and the remainder of the installation more or less diagrammatically.

A and B are a speed indicator and a distance indicator, respectively, located in any convenient position on a vessel and, in this instance, connected electrically with an electrical make-and-break mechanism C enclosed within a chamber D fitted with a pressure gauge $D^1$ and in communication with which is arranged an oil pump E coupled thereto by a distance piece F provided with a valve G.

The make-and-break mechanism C is adapted to be actuated by a rotary member H attached to the upper extremity of a flexible cable or shaft J located within a conduit such as a flexible tubing or casing K extending from the chamber D to and through the upper end cover L of a tubular receptacle M flanged at its lower end and adapted to be bolted within the hull N of a vessel above an aperture formed therein.

Fitting within said tubular receptacle M is a divisible tubular housing O containing in one or the upper part the log transmission mechanism P, and in the other or lower part the actuating means therefor, that is to say the rotator spindle Q and the rotator (not shown).

The transmission mechanism and the rotator, per se, form no part of the present invention and are therefore not described in detail.

After passing through the end cover L the flexible tubing or casing K continues down to the upper plate R or other supporting or containing member for the transmission mechanism P to which plate it is secured and the flexible cable or shaft J is operatively connected in any suitable way with a spindle S of the transmission mechanism to another spindle T of which the rotator shaft Q is also operatively connected.

The rotator shaft Q is formed externally with a helical groove $q$ extending throughout its length, or alternatively the shaft Q may have an axial passage and one or more lateral passages radiating therefrom at its ends and intermediately also if desired; said groove or passages being in communication with the space surrounding the upper end of the shaft Q and with its lower bearing or bearings (not shown).

In use the chamber D, flexible casing K and housing O are first filled with oil by means of the pump E, until the oil is observed to be escaping past the lower bearing of the rotator, and the log is then lowered into the receptacle M and fitted up for use.

Periodically, whenever it is considered necessary to replenish the oil in the transmission mechanism and the bearings, the pump E is operated thus driving a supply of fresh oil completely through the entire system and expelling all used oil and any grit or water that may have found its way into the log. This, it will be apparent, can be done without necessitating the dismantling of any part of the log.

The rotator may be of any desired form and may be mounted in any convenient position within the lower half of the divisible tubular housing which may be formed with one or more apertures for the admission of water to the rotator.

Although described above with reference to an electric log the invention is not limited to that type.

By means of the above described construction a continuous supply of lubricant is ensured for all parts of the log requiring it, and in fact a log can be flushed with lubricant if and when necessary without dismantling the log or any part of it, consequently less wear is imposed on the mechanism, greater accuracy in working is secured, and less attention is necessary than with logs as heretofore constructed.

What we claim is:

1. A ship log comprising, indicating means, a housing for attachment to the hull of a ship, part of said housing projecting externally of said hull and being submerged in the sea, a member rotatably mounted in said housing, means connecting said rotatably mounted member operatively with said indicating means, a container for lubricant, a conduit in communication with said container and with said housing and conveying lubricant to said rotatably mounted member.

2. A ship log comprising, indicating means, a housing for attachment to the hull of a ship, part of said housing projecting externally of said hull and being submerged in the sea, a member rotatably mounted in said housing, a transmission mechanism in said housing and driven by said rotatably mounted member, an operative connection between said transmission mechanism and said indicating means, a container for lubricant, a conduit in communication with said container and with said housing and conveying lubricant to said transmission mechanism and said rotatably mounted member.

3. A ship log comprising, indicating means, a housing for attachment to the hull of a ship, part of said housing projecting externally of said hull to be submerged in the sea, a rotator spindle mounted rotatably in said housing, a transmission mechanism in said housing and driven by said rotator spindle, an operative connection between said transmission mechanism and said indicating means, said operative connection being constructed for the conveyance of lubricant, and a container for lubricant, said operative connection being in communication with said container and conveying lubricant therefrom to said housing to said transmission mechanism and to said rotator spindle.

4. A ship log comprising, indicating means, a tubular housing for attachment to the hull of a ship, part of said tubular housing projecting externally of said hull to be submerged in the sea, a rotator spindle mounted rotatably in said tubular housing, a transmission mechanism in said housing connected drivably with said rotator spindle, a flexible driving connection between said transmission mechanism and said indicating means, a hollow flexible casing surrounding said flexible driving connection, and a container for lubricant having said flexible casing in communication therewith for conveying lubricant to the tubular housing, transmission mechanism and rotator spindle.

5. A ship log comprising, indicating means, a tubular housing for attachment to the hull of a ship, part of said tubular housing projecting externally of said hull to be submerged in the sea, a rotator spindle mounted rotatably in said tubular housing and having grooves formed therein, a transmission mechanism in said housing operatively connected to said rotator spindle, a flexible driving shaft connecting said transmission mechanism operatively with said indicating means, a tubular flexible casing enclosing said flexible driving shaft, and a container for lubricant having the tubular flexible casing connected at one end thereto, the opposite end of the casing being connected to said tubular housing for conveying lubricant to said housing and said transmission mechanism, said rotator spindle receiving lubricant from the housing, the lubricant being conveyed lengthwise of said rotator spindle by the grooves of the latter.

6. A ship log comprising, indicating means, a tubular housing for attachment to the hull of a ship, part of said tubular housing projecting externally of said hull to be submerged in the sea, a rotator spindle mounted rotatably in said tubular housing and having external grooves formed therein, a transmission mechanism in said housing and operatively connected to said rotator spindle, a flexible driving shaft operatively connecting said transmission mechanism with said indicating means, a tubular flexible casing enclosing said flexible driving shaft, and a container for lubricant having said tubular flexible casing connected at one end thereto, the opposite end of the flexible casing being connected to said tubular housing, and means to force lubricant from said container through said tubular flexible casing and through said tubular housing.

In testimony whereof we affix our signatures.

THOMAS SYDNEY WALKER.
JEFFERY WALKER.